(12) United States Patent
Kim et al.

(10) Patent No.: US 9,558,003 B2
(45) Date of Patent: Jan. 31, 2017

(54) RECONFIGURABLE PROCESSOR FOR PARALLEL PROCESSING AND OPERATION METHOD OF THE RECONFIGURABLE PROCESSOR

(71) Applicant: SAMSUNG ELECTRONICS CO., LTD., Suwon-si, Gyeonggi-do (KR)

(72) Inventors: Doo Hyun Kim, Seoul (KR); Joon Ho Song, Hwaseong (KR); Do Hyung Kim, Hwaseong (KR); Shi Hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 514 days.

(21) Appl. No.: 14/092,060

(22) Filed: Nov. 27, 2013

(65) Prior Publication Data

US 2014/0149714 A1 May 29, 2014

(30) Foreign Application Priority Data

Nov. 29, 2012 (KR) .................. 10-2012-0137063
Feb. 28, 2013 (KR) .................. 10-2013-0021643

(51) Int. Cl.
*G06F 9/38* (2006.01)
*G06F 9/30* (2006.01)
*G06F 15/78* (2006.01)

(52) U.S. Cl.
CPC ......... *G06F 9/3885* (2013.01); *G06F 9/30123* (2013.01); *G06F 9/30189* (2013.01);
(Continued)

(58) Field of Classification Search
None
See application file for complete search history.

(56) References Cited

U.S. PATENT DOCUMENTS 5,537,562 A * 7/1996 Gallup .................. G06N 3/063
  712/13
6,366,999 B1 * 4/2002 Drabenstott ........ G06F 9/30036
  712/11

(Continued)

FOREIGN PATENT DOCUMENTS

KR      10-0436675       6/2004
KR     1020070006804     1/2007
(Continued)

OTHER PUBLICATIONS

Bougard, B. etal., A Coarse-Grained Array based Baseband Processor for 100Mps+ Software Defined Radio, 2008, EDAA, 6 pages.*

*Primary Examiner* — Eric Coleman
(74) *Attorney, Agent, or Firm* — Staas & Halsey LLP (57) ABSTRACT

A reconfigurable processor and an operation method of the reconfigurable processor may include: a status register configured to store a status value used to determine at least one execution mode in a processor; a parallel processing scheduler configured to schedule at least one of a very long instruction word (VLIW) logic and a coarse grained architecture (CGA) logic to be used based on the stored status value; a VLIW register configured to store processed data according to the VLIW logic; and a CGA register configured to store processed data according to the CGA logic.

26 Claims, 5 Drawing Sheets

(52) U.S. Cl.
CPC .......... *G06F 9/3836* (2013.01); *G06F 9/3889*
(2013.01); *G06F 15/7892* (2013.01)

(56) References Cited

U.S. PATENT DOCUMENTS

| | | | | |
|---|---|---|---|---|
| 6,684,280 B2* | 1/2004 | Chauvel | .................. | G06F 1/206 |
| | | | | 710/244 |
| 7,281,119 B1* | 10/2007 | Cofler | .................. | G06F 9/3836 |
| | | | | 712/216 |
| 2009/0193238 A1* | 7/2009 | Bang | .................. | G06F 15/7867 |
| | | | | 712/229 |
| 2011/0069692 A1 | 3/2011 | Palkovic | | |
| 2011/0099555 A1* | 4/2011 | Kwon | .................. | G06F 15/7875 |
| | | | | 718/108 |
| 2011/0238963 A1* | 9/2011 | Kim | ...................... | G06F 9/3012 |
| | | | | 712/229 |
| 2012/0216012 A1* | 8/2012 | Vorbach | .................. | G06F 8/443 |
| | | | | 712/11 |
| 2012/0246444 A1* | 9/2012 | Jin | ...................... | G06F 15/7892 |
| | | | | 712/15 |
| 2012/0265964 A1* | 10/2012 | Murata | ............... | G06F 15/7821 |
| | | | | 712/22 |

FOREIGN PATENT DOCUMENTS

| | | |
|---|---|---|
| KR | 1020100094211 | 8/2010 |
| KR | 1020110106717 | 9/2011 |
| KR | 1020120036208 | 4/2012 |
| WO | WO2005/096143 | 10/2005 |

\* cited by examiner

RECONFIGURABLE PROCESSOR FOR PARALLEL PROCESSING AND OPERATION METHOD OF THE RECONFIGURABLE PROCESSOR

CROSS-REFERENCE TO RELATED APPLICATIONS

This application claims the priority benefit of Korean Patent Application No. 10-2012-0137063, filed on Nov. 29, 2012, and Korean Patent Application No. 10-2013-0021643, filed on Feb. 28, 2013, in the Korean Intellectual Property Office, the disclosures of which are incorporated herein by reference.

BACKGROUND

1. Field

One or more embodiments relate to quickly processing a program through adaptation to an architecture having two execution modes among various types of processors.

2. Description of the Related Art

Various types of processors have been developed.

Although a basic function referred to as execution of a program has been maintained as is, a method and architecture for executing the basic function have been continuously modified and enhanced.

A processor may have at least one execution mode. An example of a processor having two execution modes may be a reconfigurable processor that performs a very long instruction word (VLIW) mode and a coarse grained architecture (CGA) mode.

In the VLIW mode, program operation may be performed through predetermined pipeline processing by patching an instruction from an instruction cache, which is the same as a general processor. In the CGA mode, program operation may be performed by reading configuration information of a processor from storage referred to as a configuration memory.

Configuration information of a processor may include information associated with a functional unit (FU) to be selected from among a plurality of FUs simultaneously executable, an operation to be performed within each FU, and the like.

Such a processor may share a single register file.

Due to dependency that a result value of VLIW may be used as an input of CGA, or a result value of CGA may be used as an input of VLIW, a single register file is used. Thus, it may not be possible to perform parallel processing with respect to two executions modes, which may result in consuming a large amount of resources.

A processor having two execution modes may process a program that has a different characteristic within a single program through different modes. For example, among processors, there is a processor that may execute two modes, for example, a VLIW mode and a CGA mode.

In the case of processing a general instruction, the processor may be operated in the VLIW mode. In the case of processing a loop, the processor may be operated in the CGA mode. This is to enhance the overall execution rate by accelerating a loop portion.

Two modes may be sequentially executed since dependency is present between the two modes although the processor operates in the different modes. For example, a result value of VLIW may be used as an input of CGA and thus, two modes need to be sequentially executed.

However, the above sequential execution may use a relatively large amount of resources in many operators. When an operation is performed in a single mode, nothing may occur in the other mode. Accordingly, performance for resources may be degraded.

In general, the result of VLIW may affect CGA. However, in the CGA mode, an operation may be generally performed on a large amount of data. Therefore, in many cases, a result value may be stored in a memory instead of being stored in a register file.

Although not always, it is possible to remove the dependency by the register file since a result value may be input in a memory area in the case of generating a program.

Further, although a memory storing a result value of CGA may be used for subsequent VLIW, it may also be adjusted in the case of generating a program. In general, the VLIW may be used to control a program or to process a small amount of operations and the CGA may be used to process a large amount of data operations at a time. Accordingly, dependency on a memory may be relatively small between the VLIW and the CGA. A relatively large amount of data migration may occur between CGA and subsequent CGA.

SUMMARY

The foregoing and/or other aspects are achieved by providing a reconfigurable processor, including: a status register configured to store a status value used to determine whether to operate a processor in a single execution mode or in a parallel mode; a control register configured to store pending information used to adjust a point in time for initiating a subsequent program by verifying whether an operation according to a coarse grained architecture (CGA) logic is terminated; a parallel processing scheduler configured to determine whether to execute a very long instruction word (VLIW) logic and the CGA logic in the single execution mode or in the parallel mode based on the stored status value and pending information, and to schedule at least one of the VLIW logic and the CGA logic to be executed based on the determination; a VLIW register configured to store VLIW processed data according to the VLIW logic; and a CGA register configured to store CGA processed data according to the CGA logic.

When it is determined to operate the processor in the single execution mode, the parallel processing scheduler may schedule the VLIW logic and the CGA logic to be sequentially processed.

In the case of scheduling the VLIW logic and the CGA logic to be sequentially processed, the parallel processing scheduler may schedule the VLIW logic to be executed, schedule the VLIW processed data stored in the VLIW register to be duplicated to the CGA register in response to execution of the VLIW logic, schedule the CGA logic to be executed in response to termination of the VLIW logic, and schedule the CGA processed data stored in the CGA register to be duplicated to the VLIW register in response to execution of the CGA logic.

When it is determined to operate the processor in the parallel mode, the parallel processing scheduler may schedule the VLIW logic and the CGA logic to be processed in parallel.

In the case of scheduling the VLIW logic and the CGA logic to be processed in parallel, the parallel processing scheduler may schedule termination of a previous CGA logic to be verified, schedule the VLIW processed data to be duplicated to the CGA register when the previous CGA logic is terminated, and schedule the VLIW logic and the CGA logic to be processed in parallel.

The parallel processing scheduler may schedule the control register to be activated in response to execution of the CGA logic.

The foregoing and/or other aspects are achieved by providing a reconfigurable processor, including: a status register configured to store a status value used to determine at least one execution mode in a processor; a parallel processing scheduler configured to schedule at least one of a VLIW logic and a CGA logic to be used based on the stored status value; a VLIW register configured to store processed data according to the VLIW logic; and a CGA register configured to store processed data according to the CGA logic.

The parallel processing scheduler may schedule the VLIW logic and the CGA logic to be processed in parallel based on the stored status value.

The parallel processing scheduler may schedule the VLIW logic and the CGA logic to be sequentially processed based on the stored status value.

The reconfigurable processor may further include a control register configured to store pending information used to adjust a point in time for initiating a subsequent program by verifying whether an operation according to the CGA logic is terminated.

The parallel processing scheduler may verify whether the operation according to the CGA logic is terminated, and may duplicate a file stored in the VLIW register and move the duplicated file to the CGA register when the operation according to the CGA logic is terminated.

When the file stored in the VLIW register is duplicated and moved to the CGA register, the parallel processing scheduler may inform that the CGA logic is being executed by setting a value stored in the control register.

The parallel processing scheduler may simultaneously execute the VLIW logic and the CGA logic after setting the value stored in the control register.

The foregoing and/or other aspects are achieved by providing an operation method of a reconfigurable processor, the method including: storing, by a status register, a status value used to determine at least one execution mode in a processor; scheduling, by a parallel processing scheduler, at least one of a VLIW logic and a CGA logic to be used based on the stored status value; storing, by a VLIW register, processed data according to the VLIW logic; and storing, by a CGA register, processed data according to the CGA logic.

The scheduling may include scheduling the VLIW logic and the CGA logic to be processed in parallel based on the stored status value.

The scheduling may include scheduling the VLIW logic and the CGA logic to be sequentially processed based on the stored status value.

The reconfigurable processor operation method may further include storing, by a control register, pending information used to adjust a point in time for initiating a subsequent program by verifying whether an operation according to the CGA logic is terminated.

The scheduling may include verifying whether the operation according to the CGA logic is terminated, and duplicating a file stored in the VLIW register and moving the duplicated file to the CGA register when the operation according to the CGA logic is terminated.

The foregoing and/or other aspects are achieved by providing an operation method of a reconfigurable processor, the method including: storing, by a status register, a status value used to determine whether to operate a processor in a single execution mode or in a parallel mode; storing, by a control register, pending information used to adjust a point in time for initiating a subsequent program by verifying whether an operation according to a CGA logic is terminated; determining, by a parallel processing scheduler, whether to execute a VLIW logic and the CGA logic in the single execution mode or in the parallel mode based on the stored status value and pending information; scheduling, by the parallel processing scheduler, at least one of the VLIW logic and the CGA logic to be executed based on the determination; storing, by a VLIW register, VLIW processed data according to the VLIW logic; and storing, by a CGA register, CGA processed data according to the CGA logic.

When the processor is determined to be operated in the single execution mode by the parallel processing scheduler, the scheduling may include: scheduling the VLIW logic to be executed; scheduling the VLIW processed data stored in the VLIW register to be duplicated to the CGA register in response to execution of the VLIW logic; scheduling the CGA logic to be executed in response to termination of the VLIW logic; and scheduling the CGA processed data stored in the CGA register to be duplicated to the VLIW register in response to execution of the CGA logic.

When the VLIW logic and the CGA logic are scheduled to be processed in parallel by the parallel processing scheduler, the scheduling may include: scheduling termination of a previous CGA logic to be verified; scheduling the VLIW processed data to be duplicated to the CGA register when the previous CGA logic is terminated; and scheduling the VLIW logic and the CGA logic to be processed in parallel.

The foregoing and/or other aspects are achieved by providing a reconfigurable processor, including: a status register configured to store a status value; a scheduler configured to schedule the reconfigurable processor to execute in at least one of a general mode and a special mode based on the stored status value; a general register configured to store data processed according to the general mode; and a special register configured to store data processed data according to the special mode.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

When it is determined that detailed description related to a known function or configuration may make the purpose of the embodiments unnecessarily ambiguous in describing the embodiments, the detailed description will be omitted here. Also, terminologies used herein are defined to appropriately describe the exemplary embodiments and thus may be changed depending on a user, the intent of an operator, or a custom. Accordingly, the terminologies are defined based on the following overall description of this specification.

Figure 1:
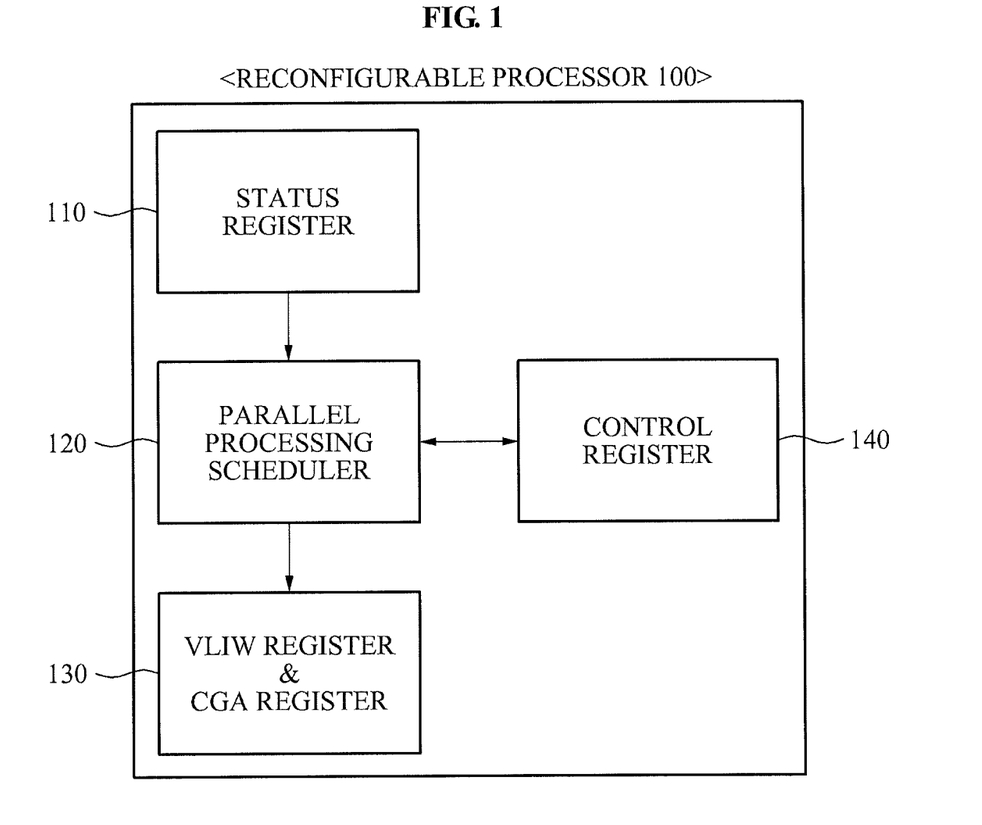
FIG. 1 illustrates a reconfigurable processor according to an embodiment.

FIG. 1 illustrates a reconfigurable processor 100 according to an embodiment.

The reconfigurable processor 100 may quickly process a program through adaptation to an architecture having two execution modes among various types of processors.

The reconfigurable processor 100 may perform parallel processing with respect to two execution modes.

Referring to FIG. 1, the reconfigurable processor 100 may include a status register 110, a parallel processing scheduler 120, a very long instruction word (VLIW) register & coarse grained architecture (CGA) register 130, and a control register 140.

The status register 110 may store a status value used to determine at least one execution mode in a processor.

The status register 110 may be intrinsically defined in order to control a variety of modes in one or more processors.

The reconfigurable processor 100 may adjust whether to operate in a single execution mode or in a parallel mode using a predetermined field of the status register 110.

The above operation may be directly set by a user through register programming of a program.

The parallel processing scheduler 120 may schedule at least one of VLIW logic and CGA logic to be used based on the stored status value.

The parallel processing scheduler 120 may schedule the VLIW logic and the CGA logic to be processed in parallel based on the stored status value.

In a processor having two execution modes, for example, VLIW and CGA, the parallel processing scheduler 120 may perform parallel processing by including a controller to control a register file that is provided to be independent for each mode.

The parallel processing scheduler 120 may schedule the VLIW logic and the CGA logic to be sequentially processed based on the stored status value.

Dependency is present between two modes although a processor operates in different modes and thus, the two modes may be sequentially executed.

The VLIW register & CGA register 130 may store processed data according to the VLIW logic or may store processed data according to the CGA logic.

The reconfigurable processor 100 may further include the control register 140 configured to store pending information used to adjust a point in time, for example, for initiating a subsequent program by verifying whether an operation according to the CGA logic is terminated.

The control register 140 may include one-bit pending information. Using the pending information, the control register 140 may verify whether the CGA logic is terminated and may adjust a point in time for initiating a subsequent program.

In the case of operating in a VLIW-CGA parallel mode, the parallel processing scheduler 120 may verify whether a previous CGA logic is terminated using the control register 140.

When a value of the control register 140 is "1", the parallel processing scheduler 120 may duplicate a current value of a VLIW register to a CGA register.

The parallel processing scheduler 120 may indicate that the CGA logic is being executed by setting a value of the control register 140 to "0".

The parallel processing scheduler 120 may simultaneously execute the VLIW logic and the CGA logic.

When the VLIW logic and the CGA logic are simultaneously executed, the VLIW logic and the CGA logic may be terminated at different points in times, for example. In this example, the VLIW logic may remain in an idle state until a value of VLIW-CGA control register becomes "1".

When the CGA logic is terminated, the parallel processing scheduler 120 may set a value of the control register 140 to "0". Accordingly, a termination point in time between the VLIW logic and the CGA logic may be synchronized.

Figure 2:
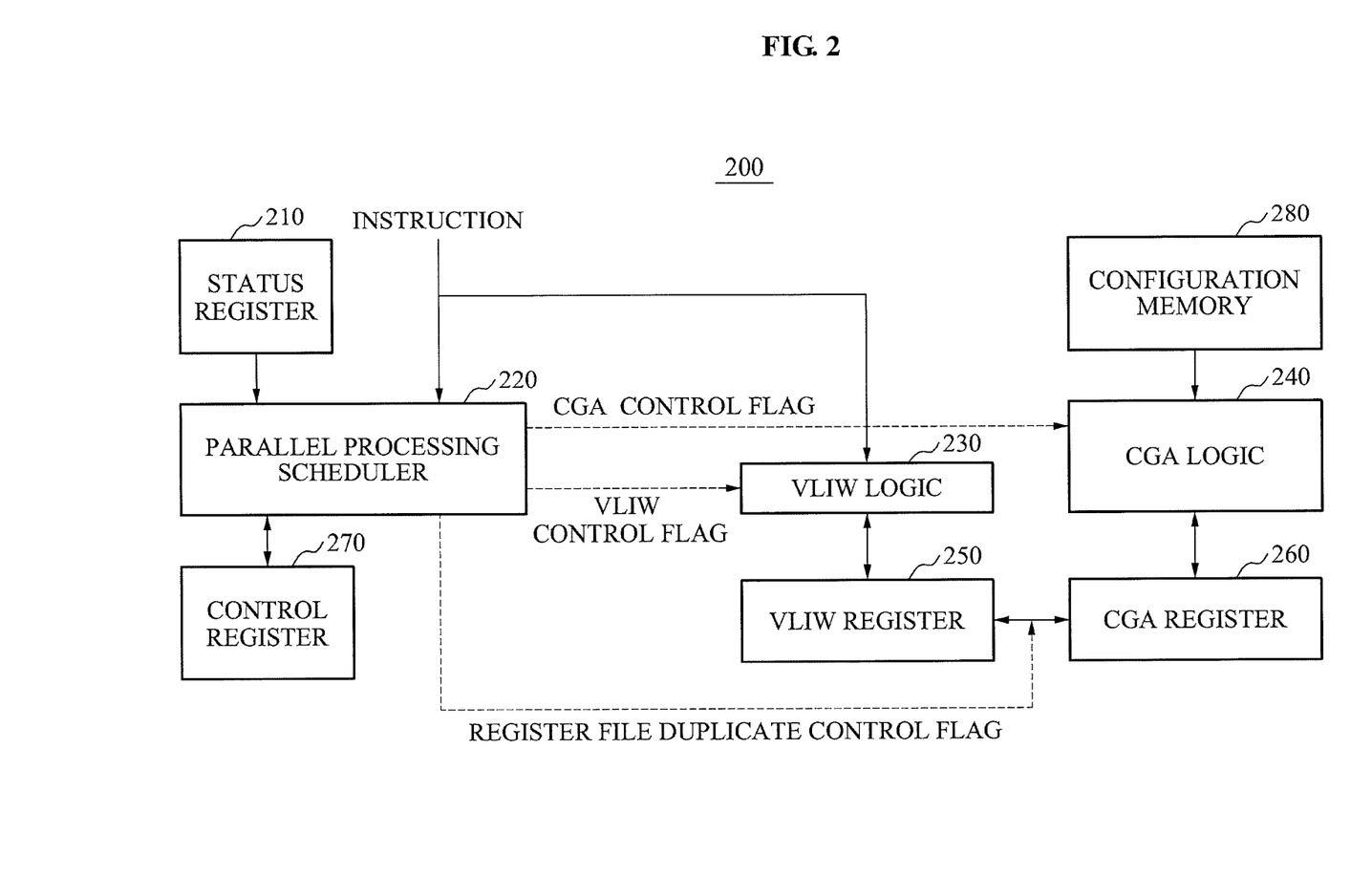
FIG. 2 illustrates a reconfigurable processor according to another embodiment.

FIG. 2 illustrates a reconfigurable processor 200 according to another embodiment.

The reconfigurable processor 200 may sequentially process a VLIW mode and a CGA mode, and may also process the VLIW mode and the CGA mode in parallel.

The reconfigurable processor 200 may store, in a status register 210, a status value used to determine at least one execution mode in a processor.

The status register 210 may be intrinsically defined in order to control a variety of modes in one or more processors.

The reconfigurable processor 200 may adjust whether to operate in a single execution mode or in a parallel mode using a predetermined field of the status register 210.

The above operation may be directly set by a user through register programming of a program.

A parallel processing scheduler 220 may schedule at least one of VLIW logic 230 and CGA logic 240 to be used based on the stored status value.

The parallel processing scheduler 220 may schedule the VLIW logic 230 and the CGA logic 240 to be processed in parallel based on the stored status value.

For example, the parallel processing scheduler 220 may schedule the VLIW logic 230 to be processed using a VLIW control flag, and may schedule the CGA logic 240 to be processed using a CGA control flag.

In a processor having two execution modes, for example, VLIW and CGA, the parallel processing scheduler 220 may perform parallel processing by including a controller to control a register file that is provided to be independent for each mode.

The parallel processing scheduler 220 may schedule the VLIW logic 230 and the CGA logic 240 to be sequentially processed based on the stored status value.

Dependency is present between two modes although a processor operates in different modes and thus, the two modes may be sequentially executed.

A VLIW register 250 may store processed data according to the VLIW logic 230, and a CGA register 260 may store processing data according to the CGA logic 240.

The reconfigurable processor 200 may further include a control register 270 configured to store pending information used to adjust a point in time, for example, for initiating a subsequent program by verifying whether an operation according to the CGA logic 240 is terminated.

The control register 270 may include one-bit pending information. Using the pending information, the control register 270 may verify whether the CGA logic 240 is terminated and may adjust a point in time for initiating a subsequent program.

In the case of operating in a VLIW-CGA parallel mode, the parallel processing scheduler 220 may verify whether a previous CGA logic is terminated using the control register 270.

When a value of the control register 270 is "1", the parallel processing scheduler 220 may duplicate a current value of the VLIW register 250 to the CGA register 260.

The parallel processing scheduler 220 may indicate that the CGA logic 240 is being executed by setting a value of the control register 270 to "0".

The parallel processing scheduler 220 may simultaneously execute the VLIW logic 230 and the CGA logic 240.

When the VLIW logic 230 and the CGA logic 240 are simultaneously executed, the VLIW logic 230 and the CGA logic 240 may be terminated at different points in times. In this example, the VLIW logic 230 may remain in an idle state until a value of VLIW-CGA control register becomes "1".

When the CGA logic 240 is terminated, the parallel processing scheduler 220 may set a value of the control register 270 to "0". Accordingly, a termination point in time, for example, between the VLIW logic 230 and the CGA logic 240 may be synchronized.

The parallel processing scheduler 220 may schedule duplicating of a file between the VLIW register 250 and the CGA register 260 using a register file duplicate control flag.

For example, the parallel processing scheduler 220 may duplicate a file stored in the VLIW register 250 and move the file to the CGA register 260.

When the file stored in the VLIW register 250 is moved to the CGA register 260, the parallel processing scheduler 220 may indicate that the CGA logic 240 is being executed by setting a value stored in the control register 270.

The VLIW logic 230 may perform a program operation through predetermined pipeline processing by patching an instruction from an instruction cache, which is the same as a general processor.

The CGA logic 240 may perform a program operation by reading configuration information of a program from a configuration memory 280.

Configuration information of a processor may include information associated with functional unit (FU) to be selected from among a plurality of FUs simultaneously executable, an operation to be performed within each FU, and the like.

As an example, the parallel processing scheduler 220 may simultaneously verify the status value stored in the status register 210 and pending information stored in the control register 270.

Accordingly, the parallel processing scheduler 220 may determine whether to execute the VLIW logic 230 and the CGA logic 240 in a single execution mode or in a parallel mode. Based on the determination, the parallel processing scheduler 220 may schedule at least one of the VLIW logic 230 and the CGA logic 240 to be executed.

When it is determined to operate the processor in the single execution mode, the parallel processing scheduler 220 may schedule the VLIW logic 230 and the CGA logic 240 to be sequentially processed.

For example, for the sequential processing, the parallel processing scheduler 220 may schedule the VLIW logic 230 to be executed, and may schedule VLIW processed data stored in the VLIW register 250 to be duplicated to the CGA register 260 in response to execution of the VLIW logic 230.

The parallel processing scheduler 220 may schedule the CGA logic 240 to be executed in response to termination of the VLIW logic 230.

For example, the parallel processing scheduler 220 may schedule CGA processed data stored in the CGA register 260 to be duplicated to the VLIW register 250 in response to execution of the CGA logic 240.

When it is determined to operate the processor in the parallel mode, the parallel processing scheduler 220 may schedule the VLIW logic 230 and the CGA logic 240 to be processed in parallel.

For example, the parallel processing scheduler 220 may verify whether a previous CGA logic is terminated, and may schedule VLIW processed data to be duplicated to the CGA register 260 when the previous CGA logic is terminated.

The parallel processing scheduler 220 may schedule the VLIW logic 230 and the CGA logic 240 to be processed in parallel.

Figure 3:
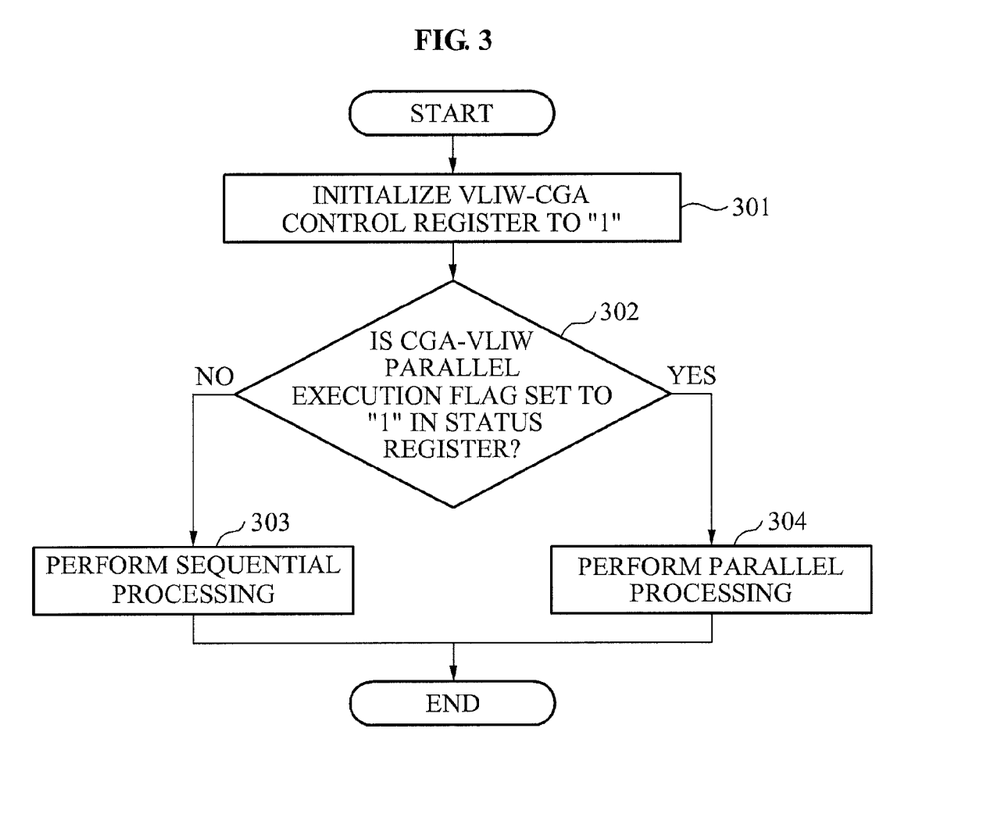
FIG. 3 illustrates an operation method of a reconfigurable processor according to an embodiment.

FIG. 3 illustrates an operation method of a reconfigurable processor according to an embodiment.

In operation 301, a VLIW-CGA control register may be initialized to "1".

In operation 302, whether to perform parallel processing with respect to a VLIW logic and a CGA logic may be determined by verifying whether a CGA-VLIW parallel execution flag is set to "1" in a status register.

To this end, in the reconfigurable processor operation method according to an embodiment, a status value used to determine whether to operate a processor in a single execution mode or in a parallel mode may be stored in the status register.

Further, the operation method of the reconfigurable processor may include store, in a control register, pending information used to adjust a point in time for initiating a subsequent program by verifying whether an operation according to the CGA logic.

When the CGA-VLIW parallel execution flag is not set to "1" in operation 302, that is, when it is determined to perform sequential processing instead of performing parallel processing in operation 302, the VLIW logic and the CGA logic may be sequentially processed in operation 303.

For example, the reconfigurable processor operation method according to an embodiment may include determining whether to execute the VLIW logic and the CGA logic in the single execution mode or in the parallel mode based on the stored status value and pending information, using a parallel processing scheduler.

When the execution in the single execution mode is determined by the parallel processing scheduler, the VLIW logic may be scheduled to be executed.

In response to execution of the VLIW logic, VLIW processed data stored in a VLIW register may be scheduled to be duplicated to a CGA register. Further, in response to termination of the VLIW logic, the CGA logic may be scheduled to be executed.

In the reconfigurable processor operation method according to an embodiment, the CGA processed data stored in the CGA register may be scheduled to be duplicated to the VLIW register according to the CGA logic.

By duplicating processed data between registers, synchronization may be performed between two separate registers.

On the contrary, when the CGA-VLIW parallel execution flag is set to "1" in operation 302, that is, when it is determined to perform parallel processing in operation 302, the VLIW logic and the CGA logic may be processed in parallel in operation 304.

For example, when the VLIW logic and the CGA logic are scheduled to be processed in parallel by the parallel processing scheduler, whether a previous CGA logic is terminated may be scheduled to be verified.

When the previous CGA logic is terminated, the VLIW processed data may be scheduled to be duplicated to the CGA register.

Further, in the reconfigurable processor operation method according to an embodiment, the VLIW logic and the CGA logic may be scheduled to be executed in parallel.

Figure 4:
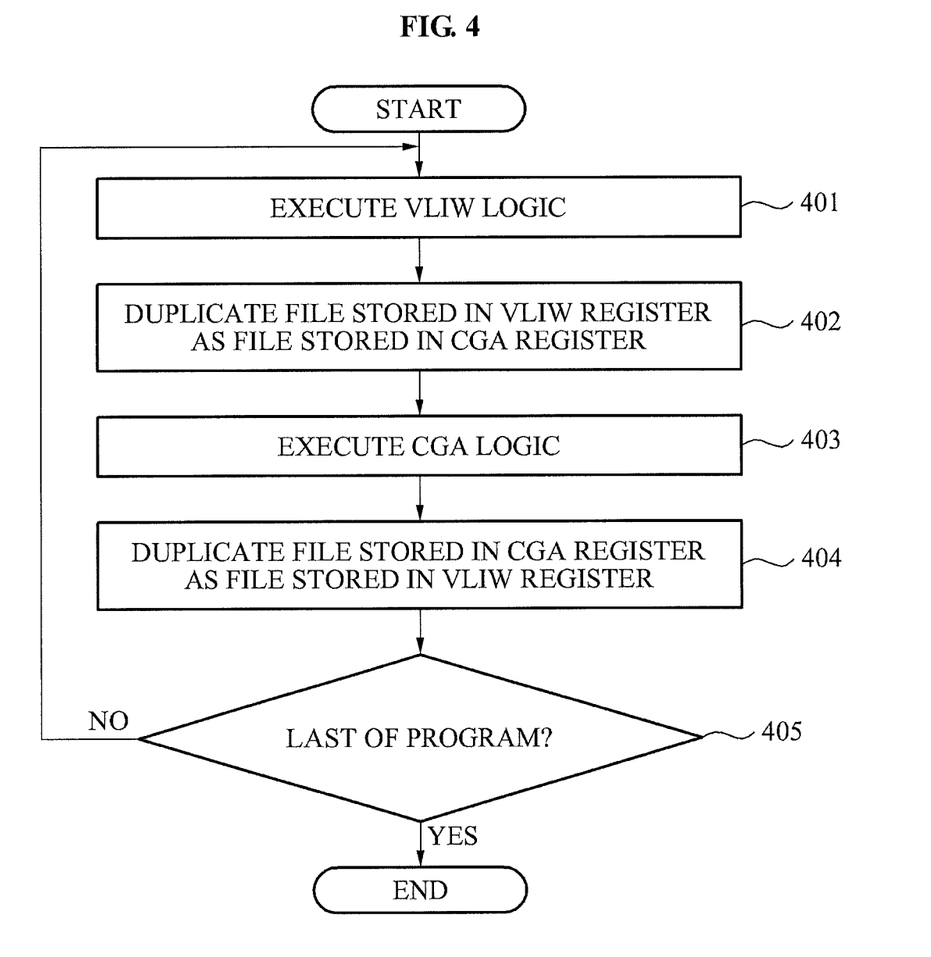
FIG. 4 illustrates a method of sequentially processing a very long instruction word (VLIW) logic and a coarse grained architecture (CGA) logic based on a result of determining of FIG. 3.

FIG. 4 illustrates a method of sequentially processing VLIW logic and CGA logic based on a result of determining of FIG. 3.

According to an embodiment, when a CGA-VLIW parallel execution flag is not set to "1", that is, when it is determined to perform sequential processing instead of performing parallel processing, the VLIW logic and the CGA logic may be sequentially processed.

To this end, the VLIW logic may be initially executed in operation 401.

In operation 402, a file stored in a VLIW register associated with the VLIW logic may be duplicated as a file stored in a CGA register.

In operation 403, the CGA logic may be executed sequentially in succession to the VLIW logic.

In operation 404, a file stored in a CGA register associated with the CGA logic may be duplicated as a file stored in the VLIW register.

In operation 405, whether current data being sequentially processed is the last of a program may be determined.

When the current data is the last of the program, the sequentially processing may be terminated.

On the contrary, when the current data is not the last of the program, the VLIW logic may be executed again.

Figure 5:
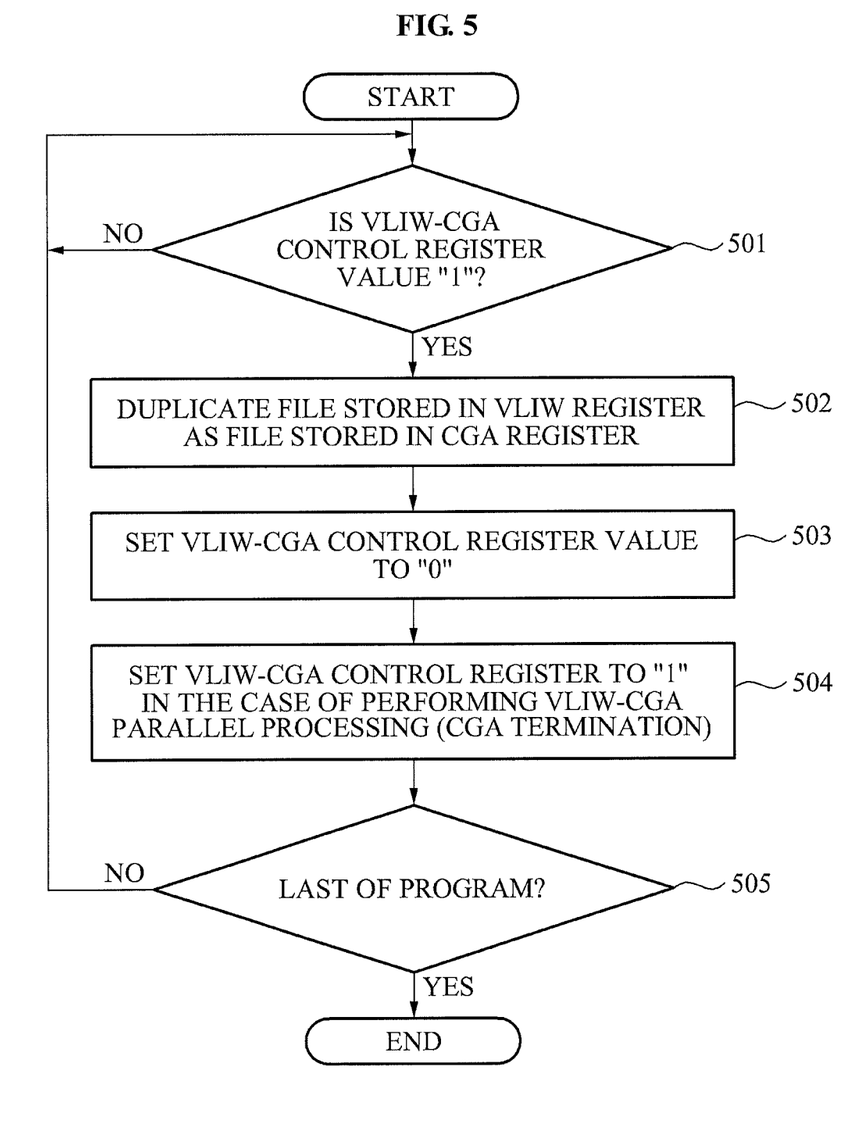
FIG. 5 illustrates a method of processing a VLIW logic and a CGA logic in parallel based on a result of determining of FIG. 3.

FIG. 5 illustrates a method of processing a VLIW logic and a CGA logic in parallel based on a result of determining of FIG. 3.

According to an embodiment, when a CGA-VLIW parallel execution flag is set to "1", that is, when it is determined to perform parallel processing, the VLIW logic and the CGA logic may be processed in parallel.

To this end, whether a VLIW-CGA control register value is "1" may be determined in operation 501.

When the VLIW-CGA control register value is "1', a file stored in a VLIW register associated with the VLIW logic may be duplicated as a file stored in a CGA register in operation 502.

In operation 503, the VLIW-CGA control register value may be set to "0". In operation 504, the VLIW logic and the CGA logic may be executed in parallel.

Here, when the CGA logic is terminated, the VLIW-CGA control register value may be set to "1".

In operation 505, whether current data processed in parallel is the last of a program may be determined.

When the current data is the last of the program, the parallel processing may be terminated.

On the contrary, when the current data is not the last of the program, whether the VLIW-CGA control register value is "1" may be verified again.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A reconfigurable processor, comprising:
   a status register configured to store a status value;
   a control register configured to store pending information used to adjust a point in time for initiating a subsequent program by verifying whether an operation according to coarse grained architecture (CGA) logic is terminated;
   a parallel processing scheduler configured to determine whether to execute very long instruction word (VLIW) logic and the CGA logic in a single execution mode or in a parallel mode based on the stored status value and pending information, and to schedule at least one of the VLIW logic and the CGA logic to be executed based on the determination;
   a VLIW register configured to store VLIW processed data according to the VLIW logic; and
   a CGA register configured to store CGA processed data according to the CGA logic,
   wherein the parallel processing scheduler is configured to:
      schedule processed data to be duplicated between the VLIW register and the CGA register in response to execution of each of the VLIW logic and the CGA logic, when the processor is operated in the single execution mode, and
      schedule processed data to be duplicated between the VLIW register and the CGA register after synchronizing of a termination point in time between the VLIW logic and the CGA logic, when the processor is operated in the parallel mode.

2. The reconfigurable processor of claim 1, wherein when the determination is to operate the processor in the single execution mode, the parallel processing scheduler is configured to schedule the VLIW logic and the CGA logic to be sequentially processed.

3. The reconfigurable processor of claim 2, wherein in scheduling the VLIW logic and the CGA logic to be sequentially processed, the parallel processing scheduler is configured to
   schedule the VLIW logic to be executed,
   schedule the VLIW processed data stored in the VLIW register to be duplicated to the CGA register in response to execution of the VLIW logic,
   schedule the CGA logic to be executed in response to termination of the VLIW logic, and
   schedule the CGA processed data stored in the CGA register to be duplicated to the VLIW register in response to execution of the CGA logic.

4. The reconfigurable processor of claim 1, wherein when the determination is to operate the processor in the parallel mode, the parallel processing scheduler is configured to schedule the VLIW logic and the CGA logic to be processed in parallel.

5. The reconfigurable processor of claim 4, wherein in scheduling the VLIW logic and the CGA logic to be processed in parallel, the parallel processing scheduler is configured to
schedule termination of a previous CGA logic to be verified,
schedule the VLIW processed data to be duplicated to the CGA register when the previous CGA logic is terminated, and
schedule the VLIW logic and the CGA logic to be processed in parallel.

6. The reconfigurable processor of claim 5, wherein the parallel processing scheduler is configured to schedule the control register to be activated in response to execution of the CGA logic.

7. A reconfigurable processor, comprising:
a status register configured to store a status value;
a parallel processing scheduler configured to schedule at least one of very long instruction word (VLIW) logic and coarse grained architecture (CGA) logic to be used based on the stored status value;
a VLIW register configured to store processed data according to the VLIW logic; and
a CGA register configured to store processed data according to the CGA logic,
wherein the parallel processing scheduler is configured to:
schedule the processed data to be duplicated between the VLIW register and the CGA register in response to execution of each of the VLIW logic and the CGA logic, when the processor is operated in a single execution mode, and
schedule the processed data to be duplicated between the VLIW register and the CGA register after synchronizing of a termination point in time between the VLIW logic and the CGA logic, when the processor is operated in a parallel mode.

8. The reconfigurable processor of claim 7, wherein the parallel processing scheduler is configured to schedule the VLIW logic and the CGA logic to be processed in parallel based on the stored status value.

9. The reconfigurable processor of claim 8, wherein the parallel processing scheduler is configured to schedule the VLIW logic and the CGA logic to be sequentially processed based on the stored status value.

10. The reconfigurable processor of claim 8, further comprising:
a control register configured to store pending information used to adjust a point in time for initiating a subsequent program by verifying whether an operation according to the CGA logic is terminated.

11. The reconfigurable processor of claim 10, wherein the parallel processing scheduler is configured to verify whether the operation according to the CGA logic is terminated, and to duplicate a file stored in the VLIW register and to move the duplicated file to the CGA register when the operation according to the CGA logic is terminated.

12. The reconfigurable processor of claim 11, wherein when the file stored in the VLIW register is duplicated and moved to the CGA register, the parallel processing scheduler is configured to inform that the CGA logic is being executed by setting a value stored in the control register.

13. The reconfigurable processor of claim 12, wherein the parallel processing scheduler is configured to simultaneously execute the VLIW logic and the CGA logic after setting the value stored in the control register.

14. An operation method of a reconfigurable processor, the method comprising:
storing, by a status register, a status value used to determine at least one execution mode in a processor;
scheduling, by a parallel processing scheduler, at least one of very long instruction word (VLIW) logic and coarse grained architecture (CGA) logic to be used based on the stored status value;
storing, by a VLIW register, processed data according to the VLIW logic; and
storing, by a CGA register, processed data according to the CGA logic,
wherein the parallel processing scheduler is configured to:
schedule the processed data to be duplicated between the VLIW register and the CGA register in response to execution of each of the VLIW logic and the CGA logic, when the processor is operated in a single execution mode, and
schedule the processed data to be duplicated between the VLIW register and the CGA register after synchronizing of a termination point in time between the VLIW logic and the CGA logic, when the processor is operated in a parallel mode.

15. The method of claim 14, wherein the scheduling comprises scheduling the VLIW logic and the CGA logic to be processed in parallel based on the stored status value.

16. The method of claim 15, wherein the scheduling comprises scheduling the VLIW logic and the CGA logic to be sequentially processed based on the stored status value.

17. The method of claim 15, further comprising:
storing, by a control register, pending information used to adjust a point in time for initiating a subsequent program by verifying whether an operation according to the CGA logic is terminated.

18. The method of claim 17, wherein the scheduling comprises verifying whether the operation according to the CGA logic is terminated, and duplicating a file stored in the VLIW register and moving the duplicated file to the CGA register when the operation according to the CGA logic is terminated.

19. A non-transitory computer-readable medium comprising a program for instructing a computer to perform the method of claim 14.

20. A reconfigurable processor, comprising:
a status register configured to store a status value;
a scheduler configured to schedule the reconfigurable processor to execute in at least one of a general mode and a special mode based on the stored status value;
a general register configured to store data processed according to the general mode; and
a special register configured to store data processed according to the special mode,
wherein the scheduler is configured to:
schedule the processed data to be duplicated between the general register and the special register in response to execution of each of the general mode and the special mode, when the general mode and the special mode are sequentially processed, and
schedule the processed data to be duplicated between the general register and the special register after synchronizing of a termination point in time between the general mode and the special mode, when the general mode and the special mode are processed in parallel.

21. The reconfigurable processor of claim 20, wherein the scheduler is configured to schedule the general mode and the special mode to be processed in parallel based on the stored status value.

22. The reconfigurable processor of claim 21, wherein the scheduler is configured to schedule the generalized mode and the special mode to be sequentially processed based on the stored status value.

23. The reconfigurable processor of claim 21, further comprising:
  a control register configured to store pending information used to adjust when to initiate a subsequent program by verifying whether an operation according to the special mode is terminated.

24. The reconfigurable processor of claim 23, wherein the scheduler is configured to copy a file stored in the general register to the special register when the operation according to the special mode is terminated.

25. The reconfigurable processor of claim 24, wherein when the file stored in the general register is copied to the special register, the scheduler is configured to inform that the special mode is being executed by setting a value stored in the control register.

26. The reconfigurable processor of claim 25, wherein the scheduler is configured to simultaneously execute the general mode and the special mode after setting the value stored in the control register.

* * * * *